US Patent Number: 4,948,671
Hattori et al.
Date of Patent: Aug. 14, 1990

[54] MULTI-LAYERED LAMINATE

[75] Inventors: Masafumi Hattori; Takayuki Inoue; Masahide Ochiumi, all of Mie, Japan

[73] Assignee: Mitsubishi Petrochemical Co., Ltd., Tokyo, Japan

[21] Appl. No.: 356,609

[22] Filed: May 25, 1989

Related U.S. Application Data

[63] Continuation of Ser. No. 715,024, Mar. 22, 1985, abandoned.

[30] Foreign Application Priority Data

Apr. 5, 1984 [JP] Japan .................................. 59-68228

[51] Int. Cl.$^5$ .............................................. B32B 9/04
[52] U.S. Cl. ................................ 428/411.1; 428/515; 428/516
[58] Field of Search ...................... 428/411.1, 515, 516

[56] References Cited

U.S. PATENT DOCUMENTS

| | | | |
|---|---|---|---|
| 3,847,728 | 11/1974 | Hirata et al. | 525/57 |
| 3,857,754 | 12/1974 | Hirata et al. | 525/57 |
| 3,931,449 | 1/1976 | Hirata et al. | 525/57 |
| 3,975,463 | 8/1976 | Hirata et al. | 525/57 |
| 4,174,335 | 11/1979 | Ohdaira et al. | 524/522 |
| 4,237,037 | 12/1980 | Takahasi | 525/57 |
| 4,349,644 | 9/1982 | Iwanami et al. | 525/57 |

FOREIGN PATENT DOCUMENTS

| | | | |
|---|---|---|---|
| 42-1032 | 1/1967 | Japan | 525/57 |
| 0014683 | 2/1977 | Japan | 525/57 |
| 0062362 | 5/1977 | Japan | 525/57 |
| 0127450 | 10/1980 | Japan | 525/57 |
| 0131033 | 10/1980 | Japan | 525/57 |
| 0155042 | 12/1980 | Japan | 525/57 |
| 0122950 | 7/1983 | Japan | 525/57 |
| 1206257 | 9/1970 | United Kingdom | 525/57 |

OTHER PUBLICATIONS

Patent Abstracts of Japan, vol. 8, No. 7 (C-204)[1444], Jan. 12, 1984; & JP-A-58 176 252 (Asahi Kasei Kogyo K.K.) 15-10-1983.

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

A transparent resin composition is described, comprising (i) from 65 to 99.9 parts by weight of a modified polyolefin which is at least partially modified with an unsaturated carboxylic acid or the anhydride thereof and having an unsaturated carboxylic acid or anhydride content of from 0.002 to 5 wt %, (2) from 35 to 0.1 parts by weight of a saponified ethylene/vinyl acetate copolymer having an ethylene content of from 25 to 75 mol % and a degree of saponification of at least 96%, and (3) from 0.5 to 200 parts by weight per 100 parts by weight of the copolymer (2) of a plasticizer. Molded articles of the resin composition have excellent transparency, moldability, mechanical strength, moisture barrier property, etc. The resin composition can be easily prepared from trimming wastes, wastes of extrusion or the like of multi-layered articles.

13 Claims, No Drawings

MULTI-LAYERED LAMINATE

This application is a continuation of application Ser. No. 06/715,204, filed on Mar. 22, 1985, now abandoned.

FIELD OF THE INVENTION

The present invention relates to a transparent resin composition. More particularly, it is concerned with a resin composition having an increased usefulness by markedly improving the transparency of a composition which has heretofore had a limited utilization due to its poor transparency.

BACKGROUND OF THE INVENTION

Saponified ethylene/vinyl acetate copolymers (hereinafter referred to as "saponified EVA") are widely used as wrapping films, bottles, cups, trays, etc. for foodstuffs and medicines, because of their good gas barrier properties, moldability, transparency, low water absorption (lower than that of polyvinyl alcohol), and so forth. These saponified EVA, however, are rarely used in the form of a single layer because of its high moisture permeability and deterioration of oxygen barrier property under high humidity, and are usually used in a multi-layer form in combination with polyolefin having high moisture barrier property, for example, as a coextruded article or an extrusion laminated article.

In production of articles, for package having such a multi-layer structure, wastes that cannot be utilized, such as trimming wastes, wastes of extrusion and the like, are inevitably formed. In some cases, the proportion of such wastes reaches about 50%.

For the above reasons, these articles such as multilayered films and containers have undesirably the increased production costs and their applications are often limited although they are very useful for package. It has been strongly desired to develop a technique which permits to utilize such wastes.

When trimming wastes, wastes of extrusion or the like of a multi-layered article of polyolefin and saponified EVA are merely mixed and extruded, a uniform mixture cannot be obtained because of their very poor compatibility and layer separation tends to occur, and the resulting molded article has very poor mechanical strength and transparency. For this reason, if the thus-formed composition is coextruded as a layer of a desired article such as a multi-layer film, the product having satisfactory transparency, moldability, mechanical strength and moisture barrier which are required as articles for package cannot be obtained, and such a product has a very low practical value. Of these disadvantages, poor transparency is most serious.

SUMMARY OF THE INVENTION

As a result of extensive investigations to overcome the above-described problems and provide a resin composition in which trimming wastes, wastes of extrusion and the like, formed in production of multi-layered articles, are effectively utilized, and which is suitable for use as a layer of a multi-layered article satisfying the above-described requirements for a packaging article, it has been found that when a specific composition ratio as described hereinafter is employed, the above-described disadvantages can be overcome and particularly, poor transparency can be greatly improved.

Accordingly, an object of the present invention is to provide a transparent resin composition comprising:

from 65 to 99.9 parts by weight of a polyolefin component which is a modified polyolefin which is at least partially modified with an unsaturated carboxylic acid or the anhydride thereof and having the unsaturated carboxylic acid or anhydride content of from 0.002 to 5 wt %;

from 35 to 0.1 parts by weight of a saponified ethylene/vinyl acetate copolymer having an ethylene content of from 25 to 75 mol % and a degree of saponification of at least 96%; and from 0.5 to 200 parts by weight per 100 parts by weight of the saponified ethylene/vinyl acetate copolymer of a plasticizer.

DETAILED DESCRIPTION OF THE INVENTION

The modified polyolefin as used herein is a modified polyolefin which is at least partially modified with an unsaturated carboxylic acid or the anhydride thereof and having an unsaturated carboxylic acid or anhydride content of from 0.002 to 5 wt %.

Suitable examples of the polyolefins which can be used for the modified polyolefin are homo- and copolymers of α-olefins having from about 2 to 12 carbon atoms, such as ethylene, propylene, butene-1, hexene-1, and 4-methylpentene-1, and copolymers of these α-olefins and unsaturated monomers other than the α-olefins, such as vinyl esters (e.g., vinyl acetate), and derivatives of unsaturated carboxylic acids other than unsaturated carboxylic acids or the anhydrides thereof (e.g., esters such as ethyl acrylate and methyl methacrylate, amides, imides, and salts). These copolymers can be graft copolymers, block copolymers, and random copolymers. The α-olefin content in the copolymers is about 50 wt % or more and preferably at least 70 wt %.

The polyolefin can be used alone or as the mixtures thereof.

Suitable examples of the unsaturated carboxylic acid or the anhydride thereof which can be used for the modification of polyolefins are acrylic acid, methacrylic acid, cinnamic acid, maleic acid, fumaric acid, itaconic acid, maleic anhydride, and itaconic anhydride. Of these compounds, acrylic acid and maleic anhydride are preferred. Maleic anhydride is particularly preferred.

Graft modification of the polyolefin with the unsaturated carboxylic acid or the anhydride thereof can be carried out by conventional techniques such as a method in which the polyolefin is placed in a solution state and then the unsaturated carboxylic acid or the anhydride thereof is introduced therein using peroxides or the like, or a method in which the unsaturated carboxylic acid or the anhydride thereof is introduced into the polyolefin in a molten state using peroxides or the like.

The unsaturated carboxylic acid or the anhydride thereof content in the modified polyolefin is from 0.002 to 5% by weight and preferably from 0.004 to 1% by weight. If the content thereof is less than 0.002% by weight, the effect for improving the transparency of the composition is insufficient, and if the content thereof is more than 5% by weight, the mechanical strength of the composition deteriorates and also such a large amount thereof is economically disadvantageous.

The modified polyolefin having such an unsaturated carboxylic acid or the anhydride thereof content range can be easily obtained by diluting a modified polyolefin having a large amount of the unsaturated carboxylic acid or the anhydride thereof introduced therein with an unmodified polyolefin, or by melt-kneading a multi-layered article comprising such a modified polyolefin layer and an unmodified polyolefin layer.

The saponified EVA as used herein has an ethylene content of from 25 to 75 mol %, preferably from 26 to 45 mol % and a degree of saponification of at least 96%, preferably at least 98%. If the ethylene content is less than 25 mol %, the saponified EVA easily absorbs moisture and the moisture dependency of oxygen permeability is increased. On the other hand, if the ethylene content is more than 75 mol %, the oxygen permeability is undesirably increased. If the degree of saponification is less than 96%, the moisture barrier property is seriously poor and the moisture dependency of oxygen permeability is undesirably increased.

From a standpoint of moldability, it is preferred for the saponified EVA to have the melt flow rate (MFR) measured according to ASTM-D569-59 (190° C., 2160 g load) of from 0.1 to 20 g/10 min. Further, it is preferred that the melting point of the saponified EVA is higher than that of the polyolefin because the effects of the present invention are exhibited more efficiently.

Plasticizers which are used in the present invention are compounds conventionally known as plasticizers for saponified EVA. Suitable examples of these plasticizers are polyhydric alcohols such as glycerine, ethylene glycol, pentaerythritol, and propylene glycol; phosphoric acid esters such as triethyl phosphate and trioctyl phosphate, and mono-ethyl-di-8-hydroxy-3,6-dioxaoctyl phosphate; ethanolamine derivative such as ethanol acetamide, ethanol formamide, and triethanolamine acetate; and carboxylic acid esters such as succinic acid mono($\beta$, $\gamma$-dihydroxypropyl)monocellosolve ester and glycolic acid ($\beta$, $\gamma$-dihydroxypropyl) ester. Of these compounds, glycerine, triethanolamine, polyethylene glycol, and polyethylene glycol glyceryl ether are particularly preferred.

The proportion of the modified polyolefin in the resin composition is from 65 to 99.9 parts by weight and preferably from 70 to 99 parts by weight, and the proportion of the saponified EVA therein is from 35 to 0.1 part by weight and preferably from 30 to 1 part by weight. The amount of the plasticizer added is from 0.5 to 200 parts by weight, preferably from 1 to 100 parts by weight, and more preferably from 1 to 50 parts by weight, per 100 parts by weight of the saponified EVA. If the proportion of the modified polyolefin is less than 65 parts by weight, the transparency of the composition cannot be improved. On the other hand, if the proportion thereof is more than 99.9 parts by weight, the mechanical strength of the composition is seriously reduced and the addition of the modified polyolefin in such large amounts is undesirable from an economic standpoint. If the proportion of the saponified EVA is less than 0.1 part by weight, because of good transparency of the composition, it is unnecessary to apply the present invention. On the other hand, if the proportion thereof is more than 35 parts by weight, the transparency is not improved sufficiently. If the amount of the plasticizer added is less than 0.5 part by weight per 100 parts by weight of the saponified EVA, the transparency is not improved sufficiently. On the other hand, if the amount thereof is more than 200 parts by weight, oozing out and reduction in mechanical strength undesirably occur.

The resin composition of the present invention can contain, as well as the above-described components, other resin and rubber components, and additives such as a stabilizer, a nucleating agent, a coloring agent and a lubricant in amounts not impairing the effects of the present invention.

The resin composition of the present invention can be prepared by melt kneading the above-described components in the conventional kneader. Further, in the light of the object of the present invention, the resin composition of the present invention can also be prepared by compounding and melt-kneading trimming wastes, wastes of extrusion and the like of multi-layered articles and the necessary and desired components.

The resin composition of the present invention also has adhesive properties and can be used as an intermediate layer in multi-layer laminates such as a laminate comprising a polyolefin layer/a layer of the resin composition of the present invention/a saponified EVA layer or a laminate comprising a polyolefin layer/a layer of the resin composition of the present invention/another adhesive resin layer/a saponified EVA layer, without deteriorating the luster, transparency, mechanical strength, moisture barrier property, etc. of the polyolefin layer, and the gas barrier property of the saponified EVA layer. This effect is more remarkable in the latter multi-layer laminate.

The present invention is described in greater detail by reference to the following non-limiting examples and the comparative examples.

EXAMPLES 1 TO 7, AND COMPARATIVE EXAMPLES 1 TO 3

To 100 parts by weight of trimming wastes (the composition is shown in Table 1) of a coextruded five-layer sheet comprising a 400 $\mu$ thick layer of polypropylene, a 50 $\mu$ thick layer of a modified polypropylene having a maleic anhydride content of 0.2 wt %, a 60 $\mu$ thick layer of saponified EVA ("EVAL EPF", produced by Kuraray Co., Ltd.; MFR 1.3 g/10 min.), a 50 $\mu$ thick layer of the same modified polypropylene as above, and a 460 $\mu$ thick layer of polypropylene was added a plasticizer for the saponified EVA as shown in Table 1, and the resulting mixture was melt kneaded at 200° C. and molded into a 1 mm thick sheet.

A cup with an opening of 125 mm×95 mm and a depth of 60 mm was produced by solid phase pressure forming process (SPPF) from the above-produced sheet at a surface temperature of 145° C. The transparency of the side wall of the cup was visually examined and the internal haze thereof was measured. The results obtained are shown in Table 1.

TABLE 1

| | Composition of Melt-Kneaded Wastes | | | | | Plasticizer | | Evaluation | |
|---|---|---|---|---|---|---|---|---|---|
| | Modified Polypropylene | | Saponified EVA | | | | | | |
| | Maleic Anhydride Content (wt %) | Amount (wt %) | $C_2$ Content (mol %) | Degree of Saponification (%) | Amount (wt %) | Type | Amount*[1] (parts by weight) | Transparency (visually judged) | Internal Haze (%) |
| Comparative | 0.02 | 92 | 32 | 99 | 8 | — | — | Extremely | >83 |

TABLE 1-continued

| | Composition of Melt-Kneaded Wastes | | | | | | | Evaluation | |
|---|---|---|---|---|---|---|---|---|---|
| | Modified Polypropylene | | Saponified EVA | | | Plasticizer | | | |
| | Maleic Anhydride Content (wt %) | Amount (wt %) | C₂ Content (mol %) | Degree of Saponification (%) | Amount (wt %) | Type | Amount*¹ (parts by weight) | Transparency (visually judged) | Internal Haze (%) |
| Example 1 | | | | | | | | poor | |
| Comparative Example 2 | " | " | " | " | " | Glycerine | 0.1 | Poor | 70 |
| Example 1 | " | " | " | " | " | " | 1 | Good | 10 |
| Example 2 | " | " | " | " | " | " | 6 | Excellent | 5 |
| Example 3 | " | " | " | " | " | " | 100 | Good | 12 |
| Example 4 | " | " | " | " | " | " | 180 | Good | 30 |
| Comparative Example 3 | " | " | " | " | " | " | 220 | Sightly poor | 60 |
| Example 5 | " | " | " | " | " | TEA | 62.5 | Fairly good | 17 |
| Example 6 | " | " | " | " | " | PEG | 12.5 | Good | 46 |
| Example 7 | " | " | " | " | " | PEGGE | 12.5 | Excellent | 5 |

Notes:
*¹Amount per 100 parts by weight of saponified EVA.
In Comparative Example 1, delamination occurred.
In Comparative Example 3, when the cup was allowed to stand at 60° C., the plasticizer oozed out. Kneadability was poor.
The symbols used in the column of plasticizers are as follows:
TEA: Triethanolamine
PEG: Polyethylene glycol (molecular weight: 200)
PEGGE: Polyethylene glycol glyceryl ether

EXAMPLES 8 AND 9, AND COMPARATIVE EXAMPLES 4 AND 5

A composition as shown in Table 2 was melt kneaded and pelletized at 210° C. using an extruder having a diameter of 40 mm and L/D=28. These pellets were press molded into a 1 mm thick sheet at 200° C. Using this sheet, a cup was produced by SPPF process at a surface temperature of 145° C. in the same manner as in Example 1. The transparency of the side wall of the cup was visually measured and the internal haze thereof was measured. The cup was also subjected to a bending test.

In the bending test, a test piece from the side wall of the cup was bent crosswise ten times and, thereafter, layer separation was examined. The rating scale was as follows:
A: No layer separation occurred.
B: Layer separation occurred to a slight extent.
C: Layer separation occurred.
D: Layer separation occurred seriously.

The saponified EVA used in Examples 8 and 9 was the same as used in Example 1. The polyvinyl alcohol used in Comparative Examples 4 and 5 was "PVA-NK05" produced by Nippon Gosei Co., Ltd. the modified polypropylene was a polymer on which 0.2 wt % of maleic anhydride was grafted.

TABLE 2

| | Example | | Comparative Example | |
|---|---|---|---|---|
| | 8 | 9 | 4 | 5 |
| Composition: | | | | |
| Polypropylene* Amount (wt %) | 82 | 64 | 82 | 64 |
| Modified Polypropylene | | | | |
| Maleic Anhydride Content (wt %) | 0.2 | 0.2 | 0.2 | 0.2 |
| Amount (wt %) | 10 | 20 | 10 | 20 |
| Saponified EVA (PVA) | | | | |
| C₂ Content (mol %) | 32 | 32 | 0 | 0 |
| Degree of Saponification (%) | 99 | 99 | 78 | 78 |
| Amount (wt %) | 8 | 16 | 8 | 16 |
| Plasticizer | | | | |
| Type | Glycerine | Glycerine | Glycerine | Glycerine |
| Amount (parts by weight)** | 6 | 6 | 6 | 6 |
| Evaluation: | | | | |
| Transparency (visually) | Excellent | Good | Slightly Poor | Poor |
| Internal Haze (%) | 7 | 17.1 | 15 | 30 |
| Bending Test | A | A | C | D |

Notes:
*"MA6" produced by Mitsubishi Petrochemical Co., Ltd.
**Amount per 100 parts by weight of saponified EVA.

EXAMPLES 10 TO 14, AND COMPARATIVE EXAMPLES 6 AND 7

A cup was produced in the same manner as in Example 8 using the same components as used in Example 8 but in the composition ratio as shown in Table 3. The cup thus produced was evaluated in the same manner as in Example 8. The results obtained are shown in Table 3.

TABLE 3

| | Example 10 | Comparative Example 6 | Example 11 | Example 12 | Example 13 | Example 14 | Comparative Example 7 |
| --- | --- | --- | --- | --- | --- | --- | --- |
| Composition (parts by weight): | | | | | | | |
| MA6 | 64 | 84 | 83.2 | 82 | 76 | 22 | — |
| Modified Polypropylene | 20 | — | 0.8 | 2 | 8 | 48 | 60 |
| EVAL-EPF | 16 | 16 | 16 | 16 | 16 | 30 | 40 |
| Glycerine* | 6 | 6 | 6 | 6 | 6 | 12 | 15 |
| Evaluation: | | | | | | | |
| Transparency (visually) | Excellent | Poor | Fairly Good | Good | Excellent | Good | Poor |
| Internal Haze (%) | 17 | 60 | 56 | 30 | 23 | 30 | 65 |

Note:
*Amount per 100 parts by weight of EVAL-EPF.

REFERENCE EXAMPLE 1

A three-layer sheet was coextruded, in which one layer was made of a composition prepared from trimming wastes of the same five-layer sheet as used in Example 2 and a plasticizer. This sheet had the layer structure of a 200 μ thick layer of polypropylene, a 200 μ thick layer of the above composition and a 60 μ thick layer of saponified EVA.

Using the three-layer sheet, a cup was produced and evaluated in the same manner as in Example 2. It was found that the cup has practically satisfactory performances in transparency, gas barrier property, stiffness, impact resistance, moisture barrier property, etc.

REFERENCE EXAMPLE 2

A four-layer sheet was coextruded, in which one layer was made of a composition prepared from trimming wastes of the same five-layer sheet as used in Example 2 and a plasticizer. This sheet had the layer structure of a 200 μ thick layer of polypropylene, a 200 μ thick layer of the above composition, a 50 μ thick layer of a modified polypropylene having a maleic anhydride content of 0.2 wt % and a 60 μ thick layer of saponified EVA.

Using the four-layer sheet, a cup was produced and evaluated in the same manner as in Example 2. It was found that the cup has same satisfactory performances as the cup produced in Reference Example 2 has.

REFERENCE EXAMPLE 3

A seven-layer sheet was coextruded, in which one layer was made of a composition prepared from trimming wastes of the same five-layer sheet as used in Example 2 and a plasticizer. This sheet had the layer structure of a 200 μ thick layer of polypropylene, a 200 μ thick layer of the above composition, a 50 μ thick layer of a modified polypropylene having a maleic anhydride content of 0.2 wt %, a 60 μ thick layer of saponified EVA, a 50 μ thick layer of the same modified polypropylene layer as above, a 200 μ thick layer of the above composition, and a 240 μ thick layer of polypropylene.

Using the seven-layer sheet, a cup was produced and evaluated in the same manner as in Example 2. It was found that the cup has same satisfactory performances as the cup produced in Reference Example 2 has.

While the invention has been described in detail and with reference to specific embodiments thereof, it will be apparent to one skilled in the art that various changes and modifications can be made therein without departing from the spirit and scope thereof.

What is claimed is:

1. A multi-layered laminate comprising a polyolefin layer, a saponified ethylene/vinyl acetate copolymer layer, a transparent resin composition layer as an intermediate layer, wherein the transparent resin composition comprises, from 65 to 99.9 parts by weight of a polyolefin component which is a polyolefin which is at least partially graft modified with a polyolefin modifier which is an unsaturated carboxylic acid or the anhydride thereof, the polyolefin component having the unsaturated carboxylic acid or anhydride content of from 0.002 to 5 wt. % and the polyolefin being a homopolymer or a copolymer of an α-olefin having from 2 to 12 carbon atoms;

from 35 to 0.1 parts by weight of a saponified ethylene/vinyl acetate copolymer having an ethylene content of from 25 to 75 mol % and a degree of saponification of at least 96%; and from 0.5 to 200 parts by weight per 100 parts by weight of the saponified ethylene/vinyl acetate copolymer of a plasticizer for the saponified ethylene/vinyl acetate.

2. The laminate of claim 1, wherein the polyolefin component has an α-olefin content of at least 70% by weight.

3. The laminate of claim 1, wherein the polyolefin modifier is acrylic acid or maleic anhydride.

4. The laminate of claim 3, wherein the polyolefin modifier is maleic anhydride.

5. The laminate of claim 1, wherein the unsaturated carboxylic acid or anhydride content is from 0.004 to 1 wt. %.

6. The laminate of claim 1, wherein the saponified ethylene/vinyl acetate copolymer has the ethylene content of from 26 to 45 mol % and the degree of saponification of at least 98%.

7. The laminate of claim 1, wherein the saponified ethylene/vinyl acetate copolymer has a melt flow rate measured according to ASTM-D569-59 (190° C., 2160 g load) of from 0.1 to 20 g/10 min.

8. The laminate of claim 1, wherein the saponified ethylene/vinyl acetate copolymer has a melting point higher than that of the polyolefin component.

9. The laminate of claim 1, wherein the plasticizer is selected from the group consisting of glycerine, triethanolamine, polyethylene glycol and polyethylene glycol glyceryl ether.

10. The laminate of claim 1, comprising from 70 to 99 parts by weight of the polyolefin component, from 30 to 1 parts by weight of the saponified ethylene/vinyl acetate copolymer, and from 1 to 100 parts by weight per 100 parts by weight of the saponified ethylene/vinyl acetate copolymer of the plasticizer.

11. The laminate of claim 9, wherein the amount of the plasticizer is from 1 to 50 parts by weight per 100 parts by weight of the saponified ethylene/vinyl acetate copolymer.

12. The laminate of claim 1, wherein the polyolefin component is a mixture of an unmodified polypropylene and an amount of polypropylene modified by graft modification with the polyolefin modifier such that the unsaturated carboxylic acid or anhydride content of the mixture is within the recited range.

13. The laminate of claim 1, which further comprises another resin layer.

* * * * *